United States Patent [19]
Pechacek

[11] 3,785,040
[45] Jan. 15, 1974

[54] MULTILAYER PRESSURE VESSEL METHOD

[75] Inventor: Raymond E. Pechacek, Houston, Tex.

[73] Assignee: Hahn & Clay, Houston, Tex.

[22] Filed: Apr. 15, 1971

[21] Appl. No.: 134,294

Related U.S. Application Data
[62] Division of Ser. No. 814,126, April 7, 1969, Pat. No. 3,604,587.

[52] U.S. Cl................................ 29/447, 29/471.1
[51] Int. Cl............................................ B23p 11/02
[58] Field of Search.................. 29/446, 447, 471.1; 220/3

[56] References Cited
UNITED STATES PATENTS

| | | | |
|---|---|---|---|
| R22,251 | 1/1943 | Stresan | 220/3 |
| 2,480,369 | 8/1949 | Jasper | 29/447 X |
| 3,224,619 | 12/1965 | Maurin et al. | 220/3 |
| 3,231,338 | 1/1966 | Andrus | 220/3 |
| 3,423,820 | 1/1969 | Pechacek | 29/447 |
| 3,457,961 | 7/1969 | Long | 220/3 X |

Primary Examiner—Charlie T. Moon
Attorney—Pravel, Wilson & Matthews

[57] ABSTRACT

A multilayer pressure vessel method wherein the vessel has both a multilayer cylindrical body and at least one multilayer head, with an inner shell being formed of stainless steel or other metal resistant to hydrogen embrittlement and with the multilayer body and multilayer head being provided with means for relieving hydrogen pressure in the layers externally of the inner shell, whereby the outer layers may be ordinary carbon steel for both the body and the head without danger of hydrogen embrittlement.

3 Claims, 5 Drawing Figures

PATENTED JAN 15 1974
3,785,040
SHEET 1 OF 2
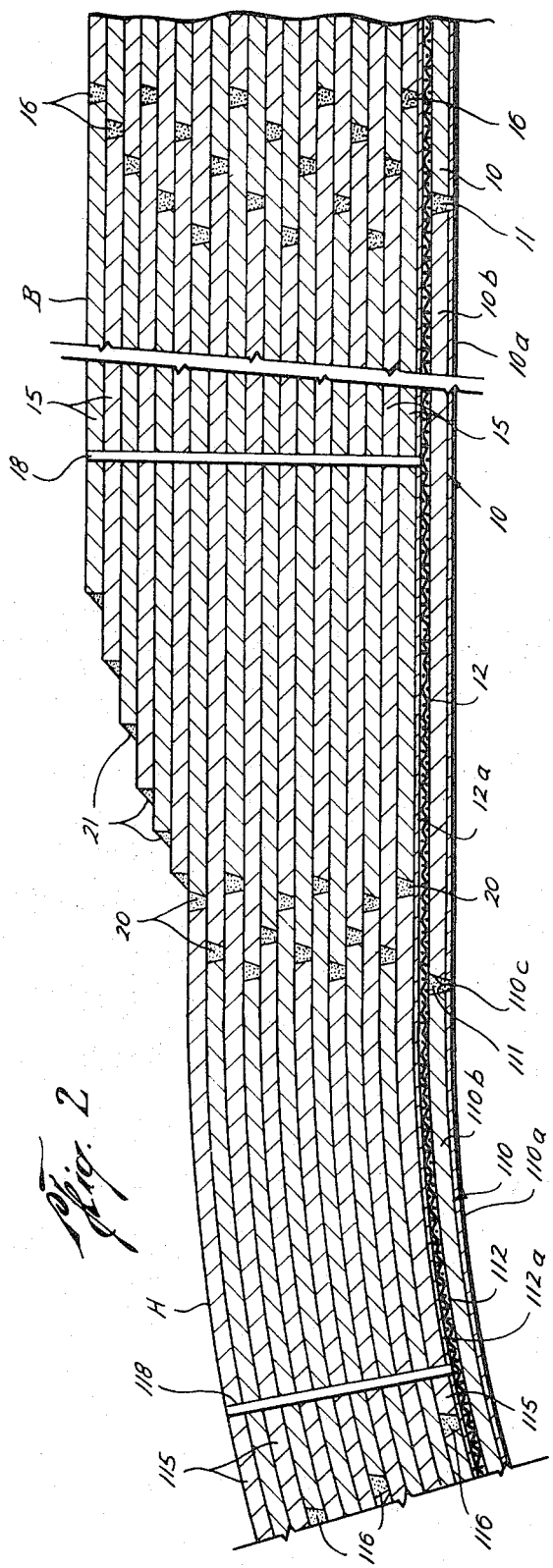
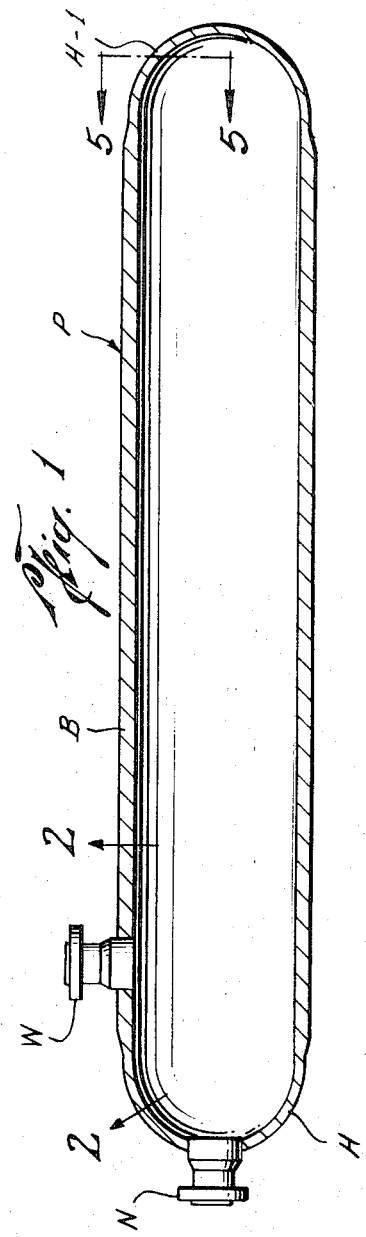
Raymond E. Pechacek
INVENTOR
BY Pravel, Wilson & Matthews
ATTORNEYS

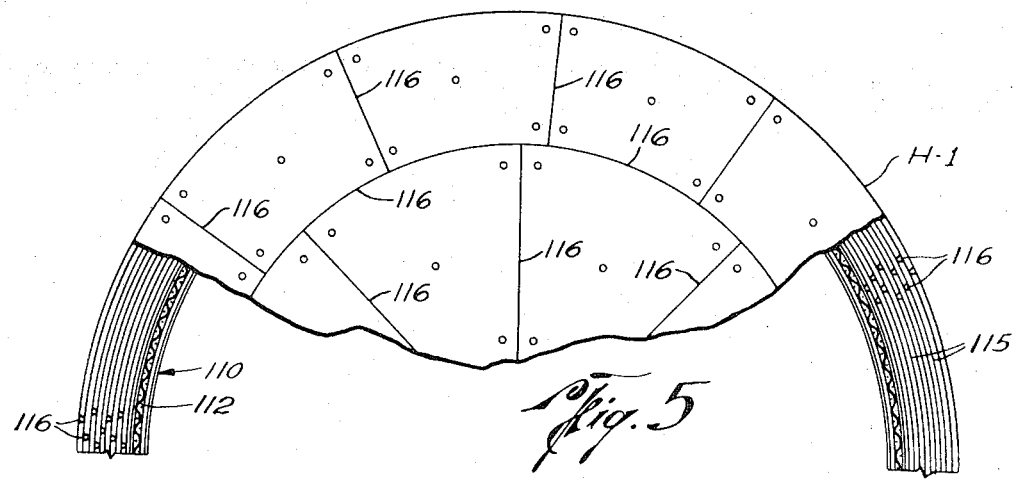
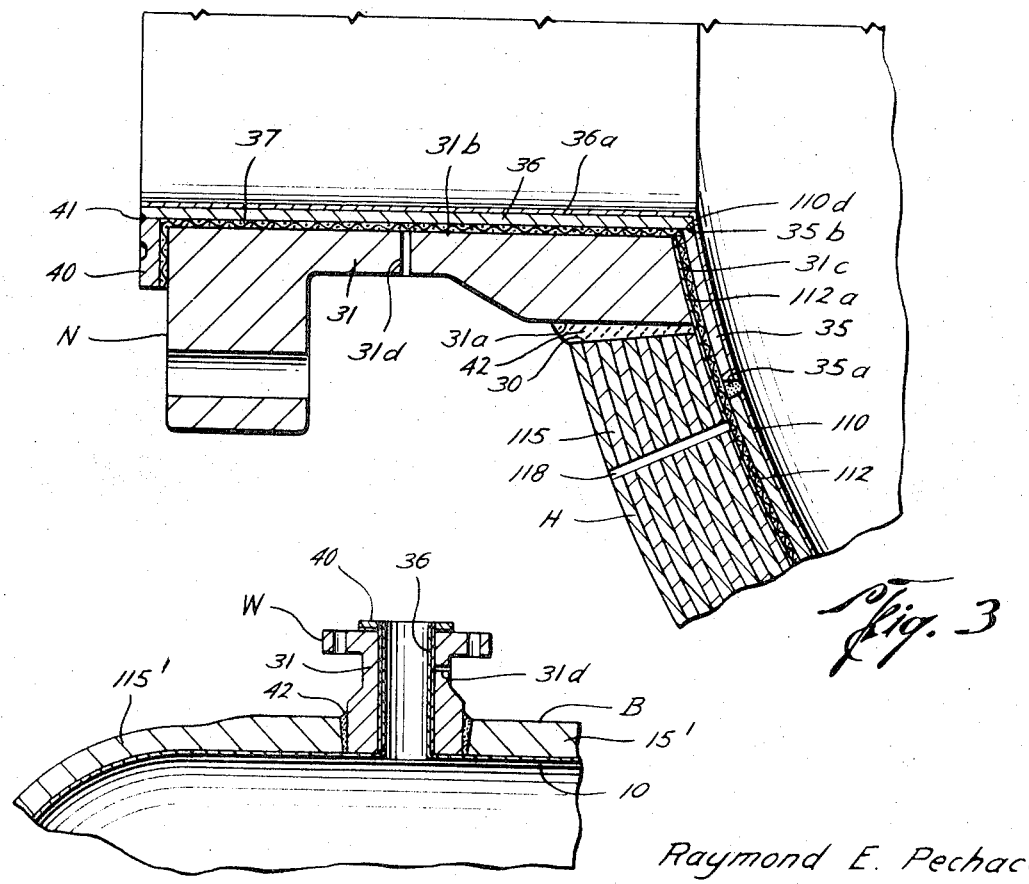

MULTILAYER PRESSURE VESSEL METHOD

CROSS REFERENCE TO RELATED APPLICATION

This application is a division of copending U.S. Patent application, Ser. No. 814,126 filed Apr. 7, 1969, now U.S. Pat. No. 3,604,587.

BACKGROUND OF THE INVENTION

The field of this invention is methods for making pressure vessels for use under conditions which would cause hydrogen embrittlement of ordinary carbon steels.

When pressure vessels are used in processes such as the hydrogenation of hydrocarbons, hydrogen is introduced or is produced in the vessel. Such hydrogen is atomic in form and when under high pressure, passes through solid walls of steel, causing an embrittlement of the wall of the vessel if the wall is made of steel which is not resistant to such hydrogen embrittlement. Stainless steel, such as alloys of steel having chromium, manganese, tungsten, vanadium, and/or aluminum and a low carbon content, are resistant to such hydrogen embrittlement; therefore, pressure vessels exposed to hydrogen gas under pressure therein have been made either entirely of stainless steel or other hydrogen embrittlement resistant materials, or the cylindrical portions have been made of multilayers with an inner stainless steel cylinder and outer layers or ordinary carbon steel (See U.S. Pat. Nos. 2,243,240 and 3,224,619).

Although the use of multilayers for the heads has been proposed many years ago in U.S. Pat. Re No.: 22,251, such construction has never been practical because the layers in the heads could not be prestressed as were the layers of the cylinder or body portions of the vessel.

For this and other reasons, it has been common commercially to still employ solid heads of stainless steel, using deep circle welds for joining the heads to the multilayer cylinders, which structure requires expensive and difficult welding procedures and materials, and still has the disadvantage of the relatively expensive solid stainless steel heads. An example of such structure in recent years is found in U.S. Pat. No. 3,224,619.

SUMMARY OF THE INVENTION

In accordance with the present invention, a method for the manufacture of a pressure vessel is provided wherein the vessel has multilayer construction for the cylindrical body portion and one or both of the heads or end closures, and wherein such multilayer body portion and heads are prestressed. The inner layer of the body portion and the head or heads is formed of stainless steel or other hydrogen embrittlement resistant material and the outer layers may be formed of ordinary carbon steel, with means provided for relieving hydrogen gas pressure in the layers externally of the inner layer of hydrogen embrittlement resistant material. The layers of the head are built up of gores with staggered welds as in U.S Pat. No. 3,423,820, and the heads are welded to the cylindrical body with staggered welds so that throughout the vessel, none of the welds needs to be thicker than the thickness of each layer welded, whereby the problems of circle seams, such as the use of special alloy welding as in U.S. Pat. No. 3,224,619 are avoided.

Thus, a fully prestressed multilayer pressure vessel is provided which is substantially free of hydrogen embrittlement with an inner shell of hydrogen embrittlement resistant material, and with the outer layers of ordinary carbon steel, while also avoiding the use of circle weld seams.

BRIEF DESCRIPTION OF THE DRAWING

FIG. 1 is a vertical sectional view illustrating a typical pressure vessel construction made by the method of the present invention;

FIG. 2 is a partial sectional view of a portion of the wall of the pressure vessel illustrated in FIG. 1, taken on line 2—2 of FIG. 1;

FIG. 3 is a partial sectional view illustrating the mounting of a typical nozzle in one of the heads of the pressure vessel; and FIG. 4 is a sectional view illustrating another vessel fitting such as a manhole, in the wall of the pressure vessel;

FIG. 5 is an end view, partly in section, of the right-hand end of the vessel of FIG. 1, showing the gores used in forming the heads of the vessel.

DESCRIPTION OF THE PREFERRED EMBODIMENTS

In the drawings, the letter P designates generally a pressure vessel made by the method of this invention which is substantially free of hydrogen embrittlement at both the cylindrical body portion B and the heads H and H–1, when such pressure vessel P is used for storage or processes wherein hydrogen or hydrogen producing materials are present within the vessel under temperature and pressure conditions which cause hydrogen to pass through relatively solid walls of steel. As will be more fully explained, the cylindrical body B may be formed of one or more cylinders formed of a plurality of layers which are prestressed. Preferably, the welds joining the heads H and H–1 to the body portion B are staggered as to each layer so that the problems of relatively deep circle welds are avoided throughout the vessel P. As will also be explained more in detail, by forming the heads H and H–1 of prestressed multilayers, the relatively expensive solid heads heretofore employed are thus replaced by the less expensive multilayer head and at the same time, the problems of hydrogen embrittlement are avoided with the present invention.

The cylindrical body portion B of the pressure vessel P may be made in any known or conventional manner for forming multilayer vessels, such as illustrated in U.S. Pat. Nos. 2,243,240 or 2,480,369. An inner cylindrical layer 10 which may comprise a clad layer 10a and a backing layer 10b forms the inner layer of the body portion B. In the event the body portion B is made from a plurality of longitudinally aligned multilayer cylinders, the inner layer 10 of each of such cylinders is joined by an annular weld such as indicated at 11 (FIG. 2). The inner layer 10 may be a single layer of a stainless steel or other alloy of steel which is resistant to hydrogen embrittlement, or such inner layer 10 may be formed of a composite material typically referred to as clad material such as shown in FIG. 2. If the clad material is employed, the clad layer 10a is normally more resistant to hydrogen embrittlement than the backing portion 10b of the layer 10. In a typical example, the inner layer 10 is one-half inch in thickness and the clad layer is one-eighth inch in thickness.

A vent layer 12 formed of wire screen or metal strips or any other suitable material having longitudinal and lateral passageways for the venting of gas is disposed externally of the inner layer 10 of each of the cylinders or sections making up the body portion B. A backup sheet or cylinder 12a is preferably positioned over the wire mesh or screen 12 to facilitate welding of the layers outwardly from the vent layer 12.

A plurality of outer layers 15 are applied to the inner layer 10, and such layers are applied so as to place same in a prestressed condition, and likewise to prestress the inner layer 10. Such prestressing procedures are well known and are disclosed in U.S. Pat. No. 2,480,369. In the preferred embodiment, when several cylinders or cylindrical sections are used for forming the cylindrical body portion B, the layers 15 having the same radius are each welded together at welds 16 which are staggered as illustrated in FIG. 2 so as to avoid having deep circle seams. The outer layers 15 may be made of ordinary carbon steel since they do not have to be resistant to hydrogen embrittlement. Likewise, the weld metal for the welds 16 does not have to be of the special alloy weld material since the deep circle seams such as disclosed in U.S. Pat. No, 3,224,619 are avoided and the hydrogen gas which might otherwise cause hydrogen embrittlement in such layers 15 and the welds 16 is permitted to escape through one or more vent passages 18 formed through the layers 15, preferably radially from the outer most layer 15 inwardly to the vent layer 12. Thus, even though atomic hydrogen developed within the vessel P passes through the inner layer 10, such hydrogen does not react with the outer layers 15 since the pressure is relieved after the gas is passed through the inner layer 10. In the absence of pressure, the hydrogen does not have the embrittling effect.

In FIG. 2, a portion of the head H is illustrated, and it will be understood that the same construction is preferably used for the head H-1 (FIG. 5) at the other end of the vessel P. The head H includes an inner layer 110 which is illustrated as having a clad layer 110a and a backing layer 110b, although it may also be formed of a single layer of stainless steel or other hydrogen resistant material. The clad layer 110a would normally correspond with the clad layer 10a of the layer 10 and would be of a steel alloy which would be more resistant to hydrogen embrittlement than the backing layer 110b. The inner layer 110 is substantially hemispherical in shape and is formed with an annular inner edge 110c which is welded to an annular edge 10c of the inner layer 10 at an annular weld 111 so that the inner head layer 110 forms a continuation of the inner layer 10 of the body portion B, and such layers 10 and 110 form an inner shell for the pressure vessel P.

The head H has a vent layer 112 which is provided by a metallic screen or spaced longitudnial strips; preferably a backing layer 112a corresponding to the backing layer 12a is also provided with the screen or vent layer 112. A plurality of outer layers 115 are disposed in a prestressed condition on the inner head layer 110 and are also disposed so as to prestress such inner head layer 110, as preferably accomplished by the method and structure disclosed in U.S. Pat. No. 3,423,820. As disclosed in that patent, the outer layers 115 are formed of gores which are applied so as to accomplish the prestress of the layers and which are preferably welded with the staggered welds 116 so that deep circle welds are not required for forming the head H. Since the vent layer 112 communicates with the vent layer 12, the hydrogen gas pressure is relieved either through the vent or vents 18 in the body portion B, or additional vent passages 118 provided in the head H itself.

The layers 115 are welded to the layers 115 by staggered welds 20 which are provided for each of the adjacent layers 15 and 115 so as to avoid having the deep circle welds and the attendant problems therewith. Since the thickness of the head may be less than the thickness of the body portion B for a particular strength desired in the vessel B, the number of layers 115 is less than the number of layers 15 and therefore the excess layers 15 are welded to the layers therebelow as indicated at 21 (FIG. 2).

The vessel P may have a nozzle N or other vessel fitting formed in either or both of the heads H and H-1. For purposes of illustration, the head H is shown with such a nozzle N and the head H-1 is shown without a nozzle N. As will be explained, the method of manufacture of the vessel P insofar as the heads and body portion are concerned is the same whether the nozzles N are present or not, since the nozzles or other vessel fittings are added after the vessel P has been manufactured under normal conditions. Also, the vessel P may have a manway W or any other vessel fitting through the wall of the body portion B as illustrated in FIGS. 1 and 4 and as will be explained more in detail hereinafter.

In carrying out the method of this invention to manufacture the pressure vessel P, the inner shell is initially formed with the inner layer 10 and one or more inner layers 110. After the inner shell is thus formed of the hydrogen resistant material, the vent layer 12 is welded or is otherwise disposed around the inner shell, using wire screen or strips of metal so as to provide for longitudinal spaces or passages throughout the entire external surface of the inner shell. The inner backup layer 112a for the head H and the inner backup layer 12a for the body portion B are then positioned on the screen or vent layers 12 and 112 and thereafter the first outer layer 115 for the head H and 15 for the body portion B are disposed on the backup layers 12a and 112a. The outer layer 115 is formed of a plurality of gores which are welded together as explained in U.S. Pat. No. 3,423,820 so as to form the first outer layer 115 which is welded to the first outer layer 15 at an annular weld 20. Since such welds 20 are preferably staggered as illustrated in FIG. 2, the first outer layer 115 preferably extends beyond the end 110c of the inner layer 110 so as to offset the weld 20 with respect to the weld 111.

The subsequent layers 115 and 15 are applied in the same manner as the first outer layers 15 and 115 and the ends thereof are offset so as to provide the staggered welds 20 as seen in FIG. 2. The layers 15 are of course prestressed in accordance with U.S. Pat. No. 2,480,369 or any other prestressing procedure.

After the full thickness of the body portion B has been developed by the layers 15 and the full thickness of the head H and the head H-1 have been developed by the layers 115, one or more vent holes 18 are drilled from the outermost layer 15 through all of the layers 15 to the vent screen or layer 12. One or more holes 118 are also preferably drilled through the head H and similarly through the corresponding construction of the head H-1. It will be understood that the procedure for the adding of the head H-1 is the same as that described for the adding of the head H since the head H-1 must be built up in layers at the same time as the head H is being built up and as the body portion B is being built up. Thus, the vessel P is constructed a layer at a time for both the body portion B and the heads H and H-1. The welds 111 and 11 are made with steel alloy metal since the inner shell of layers 10 and 110 are made of alloy steel, but the welds 16, 116, 20 and 21, as well as any other welds for the outer layers 15 and 115 may be made of ordinary weld metal for ordinary carbon steel. It should be noted that the backup layer 12a and also the backup layer 112a may be omitted since such layers are provided merely to provide a backup during the welding of the first outer layers 15 and 115.

Considering now the nozzle construction illustrated in particular in FIG. 3, the nozzle N may be forged or otherwise constructed of ordinary carbon steel so as to provide such a nozzle N at a minimum cost. Thus, a suitable opening 30 is provided in the layers 115 of the head H which corresponds with the external diameter 31a of the body 31 of the nozzle N. The inner layer 110 is provided with an opening 110d of a diameter which is smaller than the opening 30 in the layers 115 and is substantially coincidental with the inner bore 31b of the body 31 of the nozzle N. The inner annular end 31c of the nozzle body 31 rests upon the vent layer 112 or the backup layer 112a if such a backup layer 112a is present. The opening 110d may be formed in the original inner head layer 110, or it may be formed by an annular ring designated 35 (FIG. 3) which is welded to the inner layer 110 at a weld 35a. A bore liner 36 formed of stainless steel or other material which is resistant to hydrogen embrittlement is disposed in the bore 31b of the nozzle body 31, and a vent layer 37 formed of screen or other material is disposed therebetween and in communication with the vent layer 112a. The bore liner 36 may be formed of a single cylinder or may have a clad layer 36a therewith in the same manner as the inner layers 10 and 110, as previously explained. The bore liner 36 is preferably welded to the ring 35 at 35b so as to form a continuation thereof. At the outer end of the nozzle N, a ring 40 of hydrogen embrittlement resistant material is welded at 41 to the bore liner 36. To provide for the relief of the hydrogen gas pressure which may pass through the bore liner 36, one or more vent holes 31d are provided through the body 31 in communication with the vent layer 37. The nozzle body 31 is welded at 42 to the outer layers 115 of the head H with weld metal corresponding to the ordinary carbon steel of the layers 115. Thus, the bulk of the nozzle body 31 and the welding therewith to the head H is of conventional materials rather than the more expensive stainless steels while at the same time the problem of hydrogen embrittlement is avoided.

The body portion B may have a similar vessel fitting such as the nozzle or manway W shown in FIGS. 1 and 4. The particular shape or configuration thereof may be varied as will be appreciated by those skilled in the art and therefore, for purposes of illustration, the vessel fitting W is shown as essentially the same in shape as the nozzle N of FIG. 3. Also, the manner of mounting the manway W or other vessel fitting in the body portion B is essentially the same as that shown for the nozzle N in FIG. 3 and therefore like parts bear like reference numerals and letters. Although the mounting of the nozzles N and the manway W are particularly suitable for use with multilayer heads and vessels as illustrated in the present invention, they may also be used in solid wall vessels or heads wherein it is desired to use a vessel fitting made of ordinary carbon steel with a stainless steel bore liner. For this reason, in FIG. 3, the wall of the body B and the wall of the head H are shown as solid walls 15' and 115', respectively, with an inner liner 10.

The foregoing disclosure and description of the invention are illustrative and explanatory thereof, and various changes in the size, shape, and materials as well as the details of the illustrated construction may be made without departing from the spirit of the invention.

I claim:

1. A method of forming a pressure vessel which is resistant to hydrogen embrittlement, comprising the steps of:
   a. welding an inner cylindrical layer of hydrogen embrittlement resistant material to an inner substantially hemispherical layer of hydrogen embrittlement resistant material to form an inner shell;
   b. positioning a vent layer around the inner cylindrical layer and the inner hemispherical layer;
   c. thereafter adding and welding in sequence to the inner cylindrical layer and the inner hemispherical layer a plurality of outer layers on said inner cylindrical layer and on said hemispherical head, each of said outer layers on said hemispherical head being formed by a plurality of gores and the weld between each outer cylindrical layer and each hemispherical layer being only the thickness of each such layer;
   d. applying said outer layers on said inner layers so as to prestress same as each cylindrical layer and its corresponding hemispherical layer are applied; and
   e. drilling a hole through each of said outer layers to establish communication from said vent layer to the area externally of the outermost outer layer whereby the outer layers may be formed of material which is not resistant to hydrogen embrittlement but which is thus substantially free of hydrogen embrittlement.

2. The method set forth in claim 1, including:
   a. welding the gores to each other with staggered welds; and
   b. welding the ends of each of outer cylindrical layers to each outer hemispherical layer with staggered welds as they are applied whereby each weld is only the thickness of each outer layer.

3. The method set forth in claim 1, including:
   a. providing an opening through said outer layers of one diameter;
   b. providing an opening through said inner shell of a smaller diameter than the diameter of said opening through said outer layers;
   c. positioning a vessel fitting having a bore therethrough in said opening in said outer layers;
   d. disposing the wall of said bore of said fitting in substantial alignment with said opening through said inner layer;
   e. positioning the annular end of said fitting over said inner shell with a vent layer therebetween;
   f. welding the external surface of said fitting to said outer layers;

g. welding an inner bore liner of hydrogen embrittlement resistant material in said bore and to said inner shell at said opening therein;

h. spacing said inner bore liner from said fitting with a vessel fitting vent layer; and i. providing means for communicating said vessel fitting vent layer with the area externally of said fitting whereby said vessel fitting may be made of material which is not resistant to hydrogen embrittlement but which is thus substantially free of hydrogen embrittlement.

* * * * *